(12) United States Patent
Fast et al.

(10) Patent No.: US 11,121,660 B2
(45) Date of Patent: *Sep. 14, 2021

(54) SYSTEM AND METHOD FOR IMPROVING DRIVE EFFICIENCY IN AN INDUSTRIAL AUTOMATION SYSTEM

(71) Applicant: Rockwell Automation Technologies, Inc., Mayfield Heights, OH (US)

(72) Inventors: Brian R. Fast, Kirtland, OH (US); Robert J. Miklosovic, Chardon, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/673,793

(22) Filed: Nov. 4, 2019

(65) Prior Publication Data

US 2020/0067439 A1 Feb. 27, 2020

Related U.S. Application Data

(63) Continuation of application No. 16/025,086, filed on Jul. 2, 2018, now Pat. No. 10,469,016.

(51) Int. Cl.
   *G05B 19/21* (2006.01)
   *H02P 23/00* (2016.01)
   *H02P 23/14* (2006.01)

(52) U.S. Cl.
   CPC .......... *H02P 23/0077* (2013.01); *H02P 23/14* (2013.01)

(58) Field of Classification Search
   CPC .......................... H02P 23/0077; H02P 23/14
   See application file for complete search history.

(56) References Cited

U.S. PATENT DOCUMENTS

| | | | | |
|---|---|---|---|---|
| 4,710,865 A * | 12/1987 | Higomura | ............ | G05B 19/232 318/592 |
| 2008/0180045 A1* | 7/2008 | Sladek | ................. | G05B 19/416 318/270 |
| 2013/0307459 A1* | 11/2013 | Tian | ..................... | G05B 19/416 318/570 |
| 2014/0354204 A1* | 12/2014 | Tachibana | ................. | H02P 6/08 318/473 |

* cited by examiner

*Primary Examiner* — Kawing Chan
*Assistant Examiner* — Bradley R Brown

(57) ABSTRACT

Provided herein are systems, methods, and software for improving drive efficiency in an industrial automation system. In one implementation, a system comprises a mechanical load, an electromechanical device attached to the mechanical load, and a drive coupled to the electromechanical device. A processor is programmed to generate and display an acceleration curve, a duplicate acceleration curve, an energy curve and a duplicate energy curve. A user input is received indicating a change to at least a portion of the duplicate acceleration curve, and a change to the duplicate energy curve is calculated and displayed. A modified command signal based on the user input is calculated, and the drive is configured to control the electromechanical device via the modified command signal to mechanically operate the mechanical load perform a task.

20 Claims, 7 Drawing Sheets

SYSTEM AND METHOD FOR IMPROVING DRIVE EFFICIENCY IN AN INDUSTRIAL AUTOMATION SYSTEM

RELATED APPLICATIONS

This application claims the benefit of and priority to U.S. patent application Ser. No. 16/025,086 entitled "COMMON GATEWAY PLATFORM," filed on Jul. 2, 2018, which is hereby incorporated by reference in its entirety for all purposes.

TECHNICAL FIELD

Aspects of the disclosure are related to manufacturing equipment and processes, and in particular, to manufacturing equipment and processes in industrial automation applications.

BACKGROUND

The present invention relates to the field of motion control systems, and, in particular, to motion control systems operating in industrial environments.

When designing a motion control system or upgrading an existing system, system designers endeavor to select a motor having operational and performance specifications that best suit the mechanical load to be controlled. Selection of a suitable motor can depend on such factors as the horsepower of the motor, mechanical characteristics of the mechanical load driven by the motor, speed and/or precision of movement required by the industrial application, and other such factors. In general, a key criterion in selecting a suitable motor for a new or existing industrial application is the motor performance in terms of providing sufficient speed and torque to the given mechanical load in order to accomplish the specified task.

Control of the motor and, thus, movement of the mechanical load is typically provided by a command signal from a motor drive that causes power or energy to be supplied to the motor over a period of time. Accelerations and decelerations of the motor caused in response to the command signal affect the position, velocity, and jerk of the motor to control the mechanical load according to the system design. Thus, moving objects on a conveyor belt, positioning a mechanical arm, operating rotary knives, and other such industrial environment automation tasks can be performed.

Sizing and selecting motor/drive components is an important part of system design in making sure that the motor can control its mechanical load sufficiently to perform the desired task. Motion Analyzer, for example, a software tool from Rockwell Automation, Inc., may be used to assist in the sizing and selection of machine components, and RSLogix5000, for example, may be used to configure, program and execute the motion control/command signal.

If the command signal is not optimized, however, the desired industrial task may still be accomplished, but it may occur with equipment over-designed for the task and/or sized to consume more power or energy than what is required to accomplish the task. Accordingly, it would be beneficial to optimize the command signal to reduce motor performance characteristics required for the task to allow the usage of motors with a higher efficiency.

Overview

Provided herein are systems, methods, and software for improving drive efficiency in an industrial automation system. In one implementation, a system for controlling an electromechanical device using a modified movement curve in an industrial automation environment. The system comprises a mechanical load, an electromechanical device attached to the mechanical load, and a drive coupled to the electromechanical device and configured to control the electromechanical device via a command signal configured to cause the electromechanical device to mechanically operate the mechanical load to perform a task. A processor is programmed to generate an acceleration curve based on the command signal, generate a duplicate acceleration curve of the acceleration curve, generate an energy curve based on the acceleration curve, and generate a duplicate energy curve based on the energy curve. The processor is also programmed to display the acceleration curve and the duplicate acceleration curve on a display and display the energy curve and the duplicate energy curve on the display. A user input is received indicating a change to at least a portion of the duplicate acceleration curve, and the processor is programmed to calculate a change to the duplicate acceleration energy curve based on the user input, calculate a change to the duplicate energy curve based on the change to the duplicate acceleration curve, and display the change to the duplicate energy curve on the display. The processor is further programmed to generate a modified command signal based on the change to the at least a portion of the duplicate acceleration curve. The drive is further configured to control the electromechanical device via the modified command signal to mechanically operate the mechanical load perform the task.

In another implementation, a process for optimizing motor control in an industrial automation environment comprises acquiring a motor control curve configured to cause a motor to operate a mechanical load to perform a task, generating a motor acceleration curve based on the motor position curve, generating a duplicate motor acceleration curve of the motor acceleration curve, generating a motor energy curve based on the motor acceleration curve, and generating a duplicate motor energy curve based on the duplicate motor energy curve. The process further comprises displaying the motor acceleration curve, the duplicate motor acceleration curve, the motor energy curve, and the duplicate motor energy curve on a display. The process includes calculating a change to the duplicate motor acceleration curve based on a user input modifying a portion of the duplicate motor acceleration curve, calculating a change to the duplicate motor energy curve based on the change to the duplicate motor acceleration curve, and display the change to the duplicate motor energy curve on the display. The process further includes generating a modified command signal based on the change to the duplicate motor acceleration curve and controlling the motor via the modified command signal to operate the mechanical load to perform the task.

In another implementation, One or more non-transitory computer-readable storage media having program instructions stored thereon to control an electromechanical device using a modified movement curve in an industrial automation environment, wherein the program instructions, when executed by a computing system, direct the computing system to at least generate an acceleration curve based on a command signal configured to cause an electromechanical device to mechanically operate a mechanical load to perform a task, generate a duplicate acceleration curve of the acceleration curve, generate an energy curve based on the acceleration curve, and generate a duplicate energy curve based on the energy curve. The program instructions further direct the computing system to display the acceleration curve and the duplicate acceleration curve on a display and display the energy curve and the duplicate energy curve on the display. A user input is received indicating a change to at least a portion of the duplicate acceleration curve, and the program instructions further direct the computing system to calculate a change to the duplicate acceleration energy curve based on the user input, calculate a change to the duplicate energy curve based on the change to the duplicate acceleration curve, and display the change to the duplicate energy curve on the display. The program instructions further direct the computing system to generate a modified command signal based on the change to the at least a portion of the duplicate acceleration curve and to control the electromechanical device via the modified command signal to mechanically operate the mechanical load perform the task.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
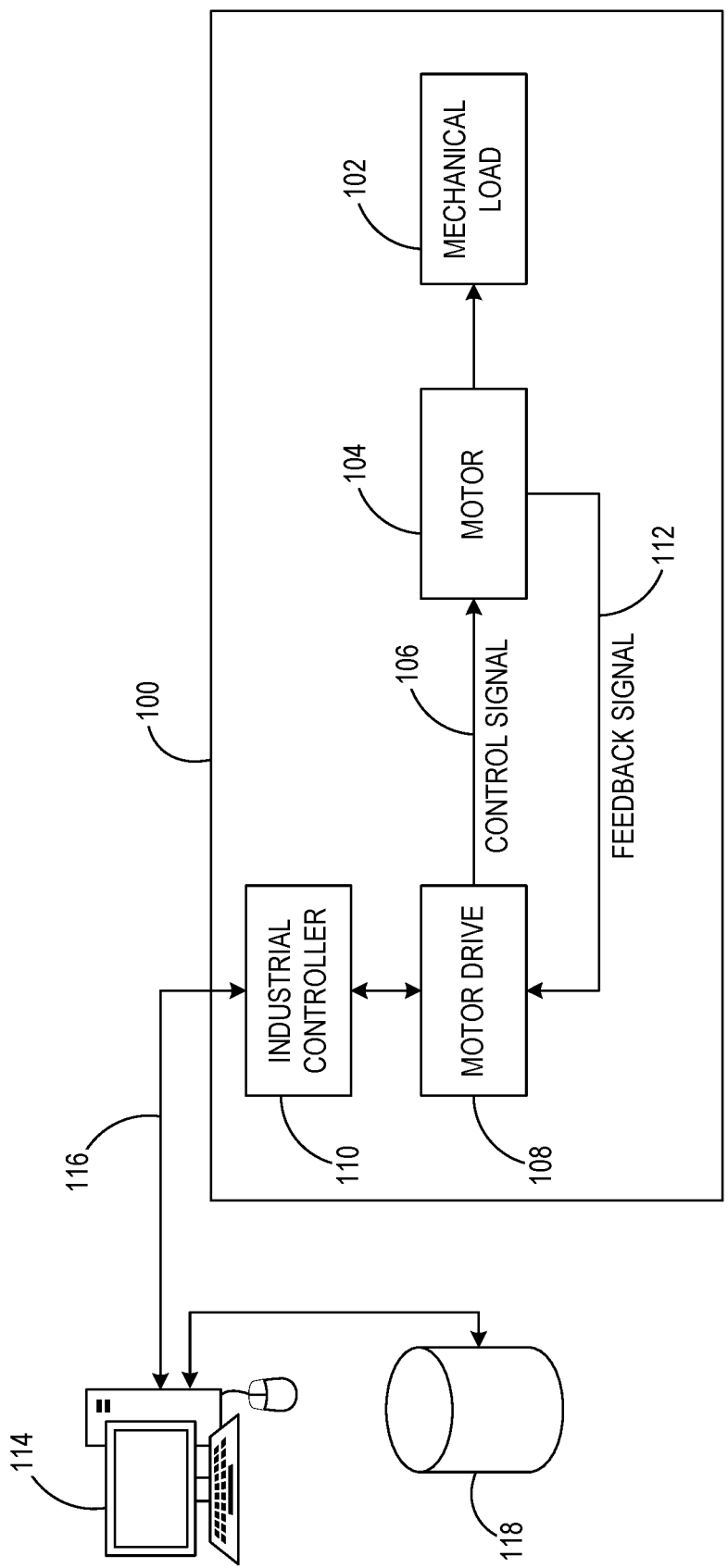
FIG. 1 illustrates a block diagram of a simplified closed-loop motor control system according to an embodiment.

Motion control systems are integral to many industrial automation applications. These systems generally comprise an electric motor or servo connected to a mechanical load, and a motor drive that controls the motor to facilitate moving or actuating the mechanical load according to a predefined control routine. The motor drive may be a stand-alone drive that controls the motor according to a control routine stored locally on the drive, or alternatively may operate under supervision of a control program executed by a separate industrial controller (e.g., a programmable logic controller or the like), which communicates with the motor drive over a plant network or via discrete hardwired I/O.

When designing a motion control system or upgrading an existing system, system designers endeavor to select a motor drive having operational and performance specifications that best suit the mechanical load to be controlled. Selection of a suitable motor drive can depend on such factors as the horsepower of the motor, mechanical characteristics of the mechanical load driven by the motor, speed and/or precision of movement required by the industrial application, and other such factors. One criterion in selecting a suitable motor drive for a new or existing industrial application is the drive performance in terms of making sure the drive can move a given mechanical load as required.

For a given motor movement profile, there is typically a minimum drive performance that is required to successfully accomplish the movement profile. A motor drive that has insufficient drive performance to operate and drive the motor according to the motor movement profile is often a poor choice and usually fails to adequately drive the motor. On the other hand, a motor drive that has the ability in excess to provide the drive performance may properly operate and drive the motor according to motor profile, but it still may be a sub-optimal choice due to an overkill in the amount of drive performance available, thereby leading to an excess of energy expenditure in performing a simpler task than what the motor drive is capable of. As such, optimization can occur in properly sizing the motor drive to the drive performance required.

However, for a given system, sizing the motor drive to a standard command signal designed to drive a motor according to a position profile may still result in a motor drive that is more powerful than one that is actually needed in the system. Through optimization of the command signal, the position profile may be accomplished by a motor having reduced drive performance requirements and, therefore, reduced energy expenditure while meeting the position profile requirements.

Accordingly, one or more embodiments of the present disclosure relate to techniques for command signal manipulation/adjustment to reduce drive performance requirements needed to accomplish the same or similar movement or position profile. These techniques yield results that reduce the amount of energy needed in the system and, therefore, allow for less-expensive hardware such as motors to be used or alternatively allow for an increase in performance availability of existing system hardware to perform more demanding tasks.

To provide a general context for the systems and methods described herein, FIG. 1 illustrates a simplified closed-loop motor control system 100. Mechanical load 102 represents a motor-driven movable component of an industrial automation system (e.g., a positioning system, a conveyor, a single-axis or multi-axis robot, a pump, a centrifuge, etc.). Motor 104 is mechanically coupled to mechanical load 102 and drives the motion of mechanical load 102 in response to a control signal 106 provided by motor drive 108. Motor drive 108 may be, for example, a variable frequency drive (VFD), a servo drive, or other type of drive. VFDs control the speed, position, and/or torque of alternating current (AC) motors by controlling the frequency and voltage of three-phase power delivered to the motor 104. Servo drives control the speed, position, or torque of servo motors by controlling the duty cycle of pulse outputs to the motor 104.

Motor drive 108 may be a stand-alone drive that controls motor 104 according to a control routine stored locally on the drive. For configurations using stand-alone motor drives, the control signal 106 to the motor 104 is determined based on a position, speed, or torque reference value generated by the local control routine on the motor drive. This reference value represents the desired position, speed, or torque of the mechanical load 102 at a given time. Alternatively, motor drive 108 may be configured to operate under supervision of a control program execute by a separate industrial controller 110 (e.g., a programmable logic controller, a safety controller, or the like), which communicates with motor drive 108 over a plant network or via discrete hardwired I/O. In such configurations, industrial controller 110 runs a control program comprising code used to process input signals read into the controller 110 where the code can comprise, for example, ladder logic, sequential function charts, function block diagrams, or structured text. Industrial controller will then generate instruction outputs (e.g., reference signals indicating a desired position, speed, and/or torque for mechanical load 102) in accordance with the control program.

In closed-loop configurations, the motor drive 108 also reads a feedback signal 112 from the motor indicating a present state (e.g., position, velocity, etc.) of the motor 104 and/or mechanical load 102. The feedback signal 112 may be generated, for example, by a resolver or encoder that tracks an absolute or relative position of the motor 104 or by a speed or position estimator. When the motor drive 108 commands the motor 104 to move the mechanical load 102 to a new position or to transition to a new speed, the motor drive 108 and/or industrial controller 110 monitors the feedback signal 112 to ensure that the mechanical load 102 has accurately transitioned to the desired position or speed. The motor drive 108 or industrial controller 110 compares the actual position/speed of the mechanical load 102 as indicated by the feedback signal 112 with the target position/speed and adjusts the control signal 106 as needed to reduce or eliminate error between the actual and target positions/speeds. It is to be appreciated that the systems and methods described herein are not limited for use with the exemplary types of motion control systems described above but rather are applicable for substantially any type of drive-based motion control system.

Industrial controller 110 couples and communicates with an electronic computer 114 having a processor, memory, and data storage over a computer network interface 116. The industrial controller 110 and the computer 114 may each have input and output devices such as a keyboard, mouse, and monitor and may each execute programs stored in non-transitory computer-readable storage medium including ROM, RAM, flash, other solid-state, disc, magnetic, optical or other drive, and provide a graphical user interface, which may include a touch screen monitor. In one embodiment, computer 114 may acquire data related to industrial controller 110 from a network storage device 118.

Figure 2:
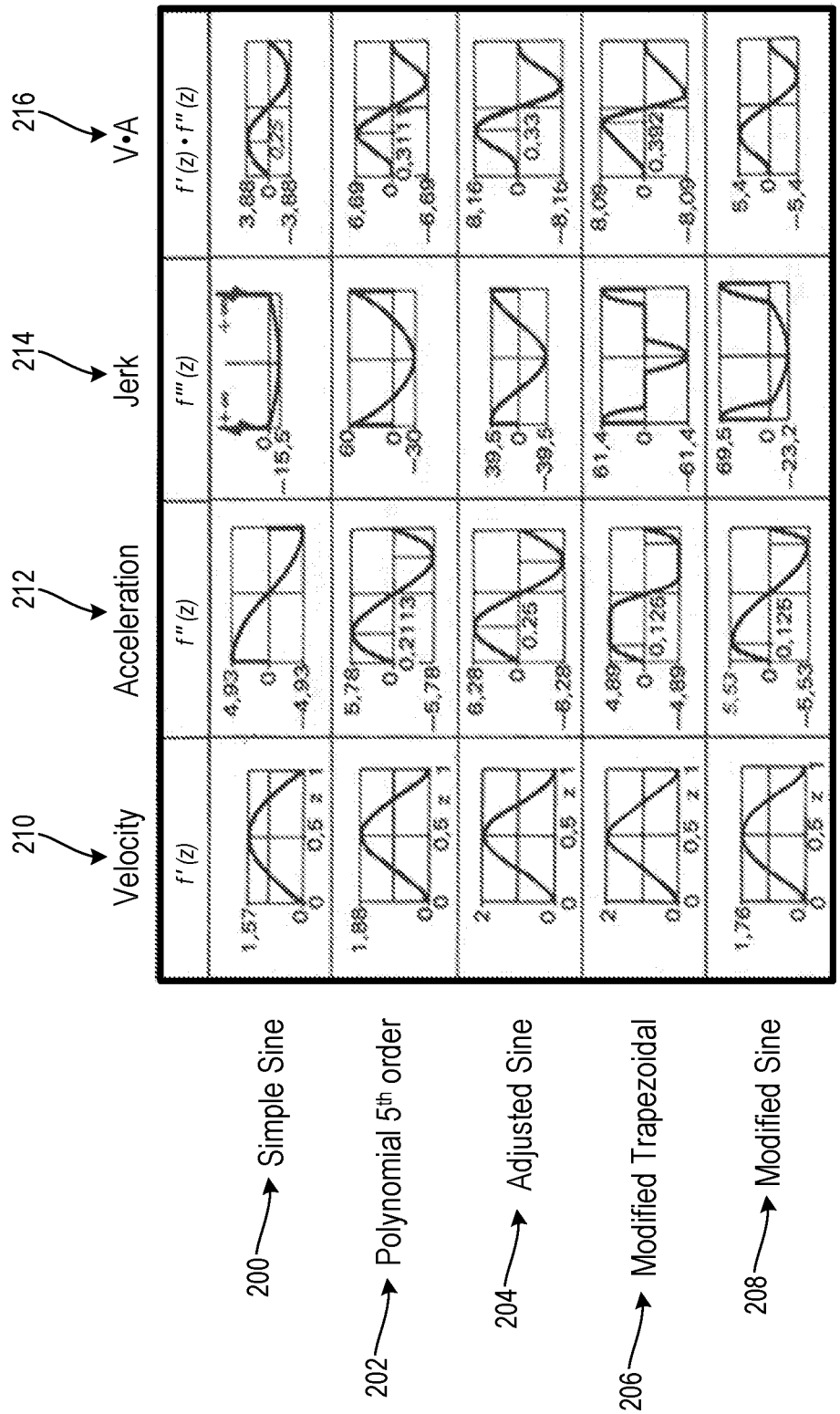
FIG. 2 illustrates prior art motion curves according to an embodiment.

FIG. 2 illustrates prior art command signal curves employable by a motor drive such as motor drive 108 for driving and controlling a motor such as motor 104. As shown, the curve types correspond with a simple sine curve type 200, a polynomial 5th order curve type 202, an adjusted sine curve type 204, a modified trapezoidal curve type 206, and a modified sine curve type 208. The curve types 200-208 illustrated in FIG. 2 are examples of known, standard curve types and do not form an exhaustive list thereof.

For each illustrated curve type 200-208, its respective first, second, third order derivative curves (respectively corresponding with velocity 210, acceleration 212, and jerk 214) are shown. In addition, each curve type 200-208 also includes a resultant power curve 216 that is the result of the velocity curve 200 multiplied by the acceleration curve 202.

In designing a command signal utilizing the prior art command signal curve types 200-208, a system designer may first establish a control or movement profile/curve for an intended motor in order to accomplish a specific task. In one embodiment, the control curve may be based on a position profile of the motor. In another embodiment, the control curve may be based on a velocity profile of the motor. The position and velocity profiles indicate how the motor should be controlled in order to accomplish the movement. The motor may be an electric motor that provides rotary motion for causing a system machine or load to complete an industrial task such as placing a box on a conveyor belt, rolling the conveyor belt, filling the box that was placed on the conveyor belt, closing the filled box, dispensing glue in order to secure the filled box, or other industrial system tasks. After the position/velocity profile is established, the system designer may assign the movement type based on the command signal curve types 200-208. That is, in order to accomplish the movement profile, the system designer may choose, for example, the polynomial 5th order curve type 202 or the modified sine curve type 208 to control the motor's movement. Any of the other curve types may also be chosen. The chosen curve type may, in some instances, be based on the system designer's preference, system design specifications, motor performance specifications that most closely match the curve type, or the like. Once the curve type is chosen, the typical or prior art system design process utilizes the default curve type that was chosen without further modification of the curve type. However, to fit the position/velocity profile, the chosen curve type may be stretched in amplitude and time to ensure the final position/velocity is reached as desired. This stretching, however, does not alter the curve's relative characteristics. This type of system design allows some flexibility in the design, but optimization in order to more efficiently control the system energy usage is not provided.

Embodiments of the invention provide optimization beyond mere selection of known curve types in order to reduce the energy used in the system such that smaller and potentially more-efficient motors may be used to accomplish the same or similar tasks. Accordingly, the optimized system provides potential cost savings by using less energy and by allowing smaller, cheaper motors used than what would be required in the unoptimized system.

Figure 3:
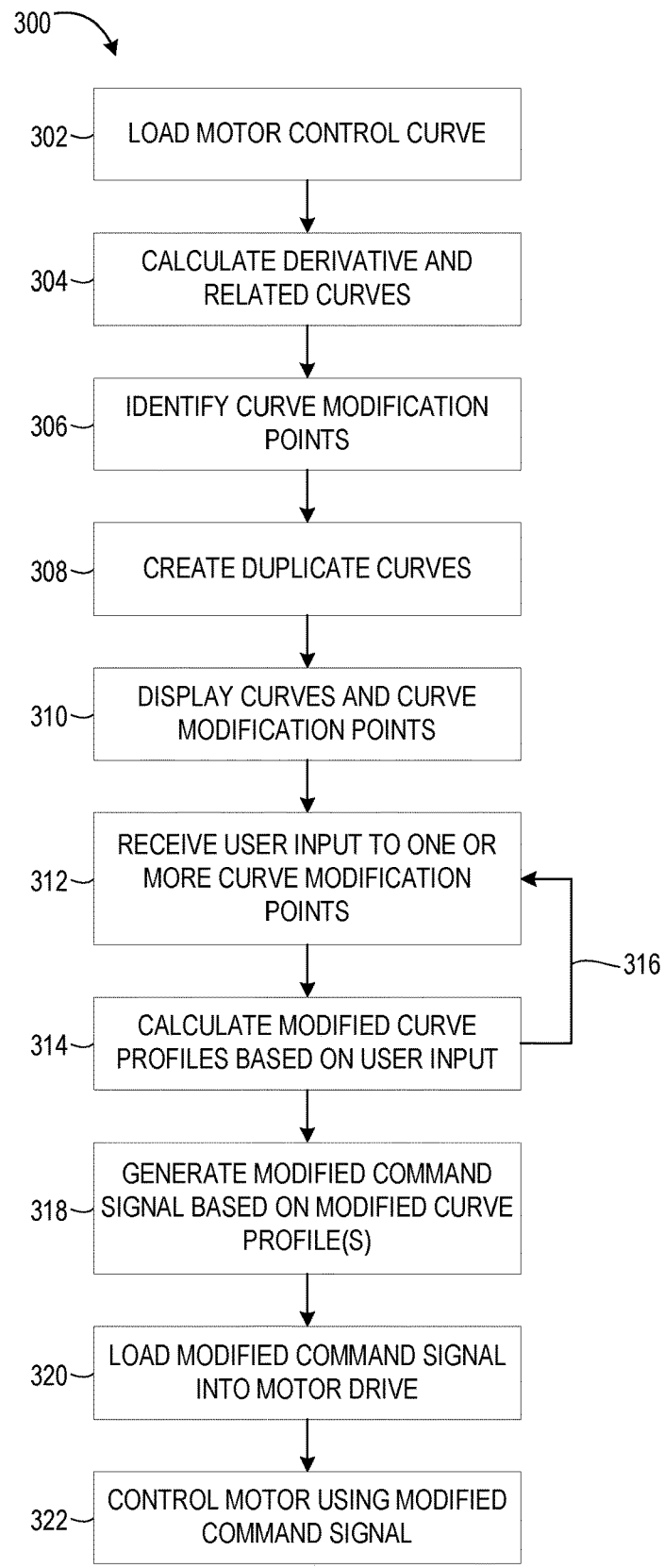
FIG. 3 illustrates a process for optimizing motor motion design according to an embodiment.
Figure 4:
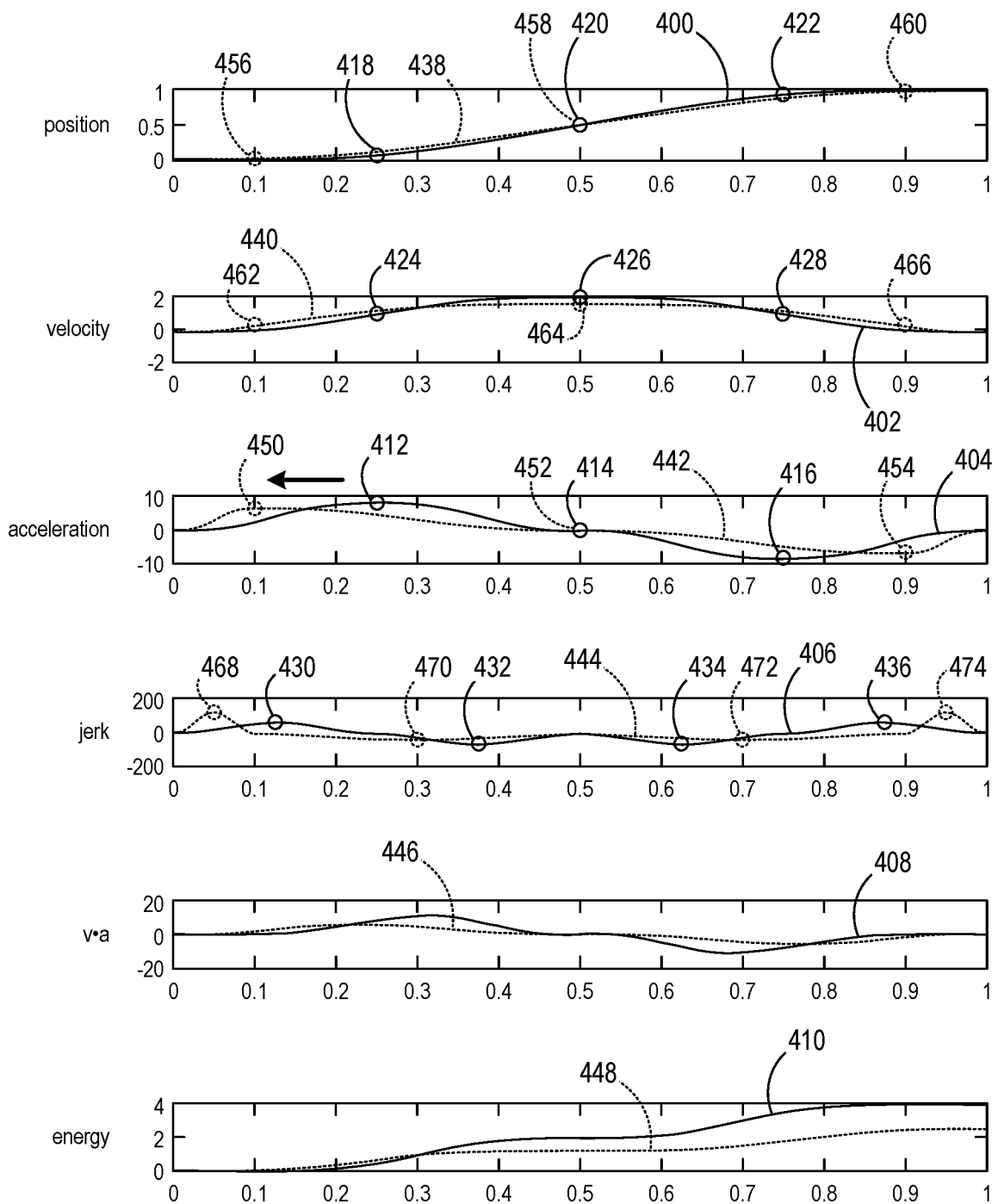
FIG. 4 illustrates a position-based graphical motion profile adjustment according to an embodiment.

FIG. 3 illustrates a flowchart showing a motor optimization process 300 for optimizing motor motion design according to an embodiment. FIG. 4 illustrates graphical curves generated, calculated, and/or manipulated via motor optimization process 300. FIGS. 3 and 4 will be referenced together herein below to more fully describe and illustrate embodiments of the invention herein.

Process 300 may be processed by computer 114. Process 300 begins at step 302 and acquires and loads a motor control curve 400 to be modified/optimized according to embodiments of the invention. As illustrated in FIG. 4, the motor control curve loaded for modification is a motor position curve. The motor control curve may be defined by a set of points in a table, by a mathematical equation, or by other means that control movement of the motor position over time. The set of points in a table may define, for example, a cam function or equation. Loading the motor control curve at step 302 includes identifying or calculating the position curve defined by the set of points or mathematical equation such that the motor position over time is represented by the position curve. The motor control curve may be stored on industrial controller 110 or motor drive 108 and supplied to computer 114 in response to a request therefor. Alternatively, the motor control curve may be stored on computer 114 or on some other network storage device (e.g., network storage device 118) to which computer 114 has access.

After the motor control curve 400 is loaded, its derivative curves are calculated at step 304. As shown in FIG. 4, a velocity curve 402, which is the first derivative of the position curve 400, is calculated by taking the first derivative of the motor control curve 400. Similarly, an acceleration curve 404, which is the second derivative of the position curve 400, and a jerk curve 406, which is the third derivative of the position curve 400, are calculated. The acceleration curve 404 may be calculated by taking the second derivative of the motor control curve 400 or the first derivative of the velocity curve 402. The jerk curve 406 may be calculated by taking the third derivative of the motor control curve 400, taking the second derivative of the velocity curve 402, or taking the first derivative of the acceleration curve 404. Additional generated curves include a power curve 408, which is formed by the multiplication or other combination of the velocity curve 402 with the acceleration curve 404, and an energy curve 410, which is formed by integrating the power curve 408 and which provides an idea of the energy content required to perform the motor control curve 400.

At step 306, one or more curve modification points are determined or identified. In one embodiment, curve modification points 412-416 respectively corresponding with maximum, central, and minimum values of the acceleration curve 404 are identified. The curve modification points may be determined or identified for local maximum/minimum values, inflection points, central locations, and other locations of interest. Corresponding curve modification points 418-422 are identified for the motor control curve 400 as well as for the velocity curve 402 (curve modification points 424-428). Curve modification points 430-436 for the jerk curve 406 are determined for various maximum and minimum values and do not correspond in time with the points 412-416 in this example, but time correspondence with points 412-416 may be desired in other implementations.

At step 308, duplicate curves are created of the previously loaded and calculated curves 400-410 with their respective curve modification points 412-436 in order to display, view, and compare results in curve modification. As illustrated in FIG. 4, the original, unmodified position curve 400 loaded at step 302 together with its derivatives and other related curves 402-410 are shown in solid lines while a modified position curve motor control curve 438 described herein below together with its derivatives and other related curves (modified velocity curve 440, modified acceleration curve 442, modified jerk curve 444, modified power curve 446, and modified energy curve 448) and their respective curve modification points 450-474 are shown in dotted lines. Other display differences such as different colors may be used in addition or alternatively thereto. When initially created, the modified curves 438-448 match the respective curves 400-410. However, as the modified curves 438-448 get modified by the user, the matching and similarity with the respective curves 400-410 disappear.

One or more of the created original and duplicate curves 400-410, 438-448 are displayed for the user at step 310. In a preferred embodiment, at least the curves related to acceleration and energy (curves 404, 442, 410, and 448) are displayed to allow the user to manipulate and modify the acceleration curve 442 while viewing comparison results in the energy curves 410, 448. However, it is contemplated that all of the created original and duplicate curves 400-410, 438-448 are displayed for the user to allow the user to view the results that apply in response to each modification.

Figure 5:
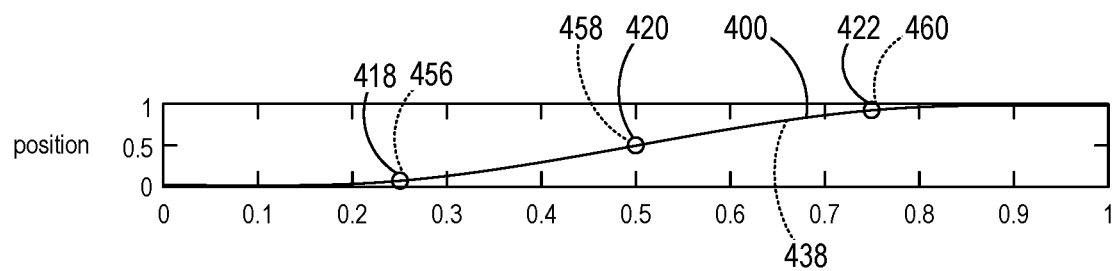
FIG. 5 illustrates the display of a pair of related motor position curves according to an embodiment.

Referring to FIG. 5, the motor control curve 400 and its duplicate motor control curve 438 are shown superimposed one on top of the other to show an example of the result of performing step 310. As explained below, modification to any of the curve modification points 456-460 begins the process of distinguishing motor control curve 438 from motor control curve 400. On the display, motor control curves 400 and 438 may be shown in difference colors, different line styles, any combination of colors and line styles, etc. to allow the user to more easily distinguish between them.

Referring back to FIGS. 3 and 4, at steps 312 and 314, a user modification in the position of one or more curve modification points is received, and updated results of the modified curves are calculated and displayed. In particular, at step 312, the user inputs a change in the position of one of the curve modification points. User input that modifies or changes the position of a curve modification point includes receiving a mouse input, a touch input, or other similar input directly on a graphical object representing the curve modification point as the user moves the point left or right in time. The horizontal, time axes illustrated in the graphs of FIG. 4 range from 0 to 1 and may indicate a time change from 0 to 1 second or a time change of a different time duration that is normalized to the range of 0 to 1. According to additional embodiments, user input changing the curve modification points may be accomplished via rotation of a virtual or mechanical knob, manipulation of a scrollbar object, text entry via a keyboard or other similar device of the desired time or relative time change, or other the like.

FIG. 4 shows an example of the user having modified or manipulated the time position of curve modification point 450 from its previous position corresponding with curve modification point 412 around time point 0.25 to its new time point around time point 0.1. Modification of the curve modification points may be set up such that when one curve modification point is modified, the corresponding curve modification point of the same curve but on the opposite side of the curve center is reciprocally modified. In this mode, the modification of curve modification point 450 causes a similar time adjustment/modification in curve modification point 454. Accordingly, curve modification points 450, 454 move together but in opposite directions in response to the movement of one of the pair of points. In an alternative mode, each curve modification point is independent of other curve modification points and is moved independently without a reciprocal movement of another point.

During or in response to user editing of the curve modification point 450, the area under the modified acceleration curve 442 is calculated and maintained. That is, in order to maintain the area under the modified acceleration curve 442 constant, the peak value of the curve modification point 450 is adjusted. In the example illustrated in FIG. 4, the peak value of the curve modification point 450 is reduced compared with the original peak value at curve modification point 412. In this manner, the movement from position 0 to position 1 as defined by modified motor control curve 438 remains fixed to the original time. Thus, the motor that is manipulated and/or controlled by the modified motor control curve 438 results in the finished task being completed on time and in a similar or same manner.

As a result of the change, at step 314, to curve modification points 450, 454 of modified acceleration curve 442, motor optimization process 300 calculates modified curve profiles of the other modified curves (e.g., modified motor control curve 438, modified velocity curve 440, modified jerk curve 444, modified power curve 446, and modified energy curve 448) at step 314. For example, the peak acceleration at curve modification point 450 corresponds with the inflection point at curve modification point 462, so curve modification point 462 is also be modified to match the change. Corresponding curve modification point 456 is also modified accordingly. The calculation at step 314 is preferably performed in real-time or near real-time to allow the user to view substantially instantaneous changes in the set of modified curve profiles 438-448.

While the example illustrated in FIG. 4 is described with respect to the modification of curve modification point 450, embodiments of the invention contemplate the user input to include modification of any of the curve modification points 412-436 and 450-474. Appropriate re-calculations of the modified curves other than the one being currently modified by the user are performed as described herein.

As a result of user input modification to curve modification point 450, curve modification point 468 of modified jerk curve 444 is moved to the left, and its peak value is increased (to maintain a similar area under the curve). The increased jerk indicates that the motor, when controlled via the modified motor control curve 438, will experience a rougher operation as compared with the unmodified motor control curve 400. Depending on the type and/or operational specifications of the motor, the re-positioning of the jerk maximum peak value earlier in time and stronger in magnitude may more closely match the characteristics of the motor, which can increase motor efficiency and life. Alternatively, the characteristics of the motor may cause it to experience an increase in stress at an inefficient point, thus possibly reducing its life. User manipulation of the curve modification point 450 (and the other curve modification points) allows the user to verify one or more positions of the points in order to optimize motor performance in achieving the movement from position 0 to position 1.

As indicated by flowchart arrow 316, motor optimization process 300 may continue to receive additional user inputs to the same or to other curve modification points that will cause the modified curve profiles to be further calculated and displayed. Calculation of the modified power curve 446 and the modified energy curve 448 allows the user to view the resulting changes in projected power and energy usage in real-time or as often as the modified curve profiles are re-calculated in step 314.

After the user input has finished, the user may cause motor optimization process 300 to generate a new, modified command signal based on the modified motor control curve 438 at step 318. The modified command signal, which is distinct from the original command signal, is then loaded into a motor drive (e.g., motor drive 108) coupled to the intended motor (e.g., motor 104) at step 320. Loading the modified command signal into the motor drive may include first converting the modified command signal into a set of tabular values. Alternatively, the modified command signal function or equation may be loaded into the motor drive. For example, the computer 114 may transmit the modified command signal function, equation, or set of tabular points to the motor drive for storage therein. The computer 114 may alternatively transmit the modified command signal function, equation, or set of tabular points to the industrial controller 110 to be stored and used during system operation.

At step 322, the motor is controlled via the motor drive according to the modified command signal as defined in the control of the industrial automation system.

Figure 6:
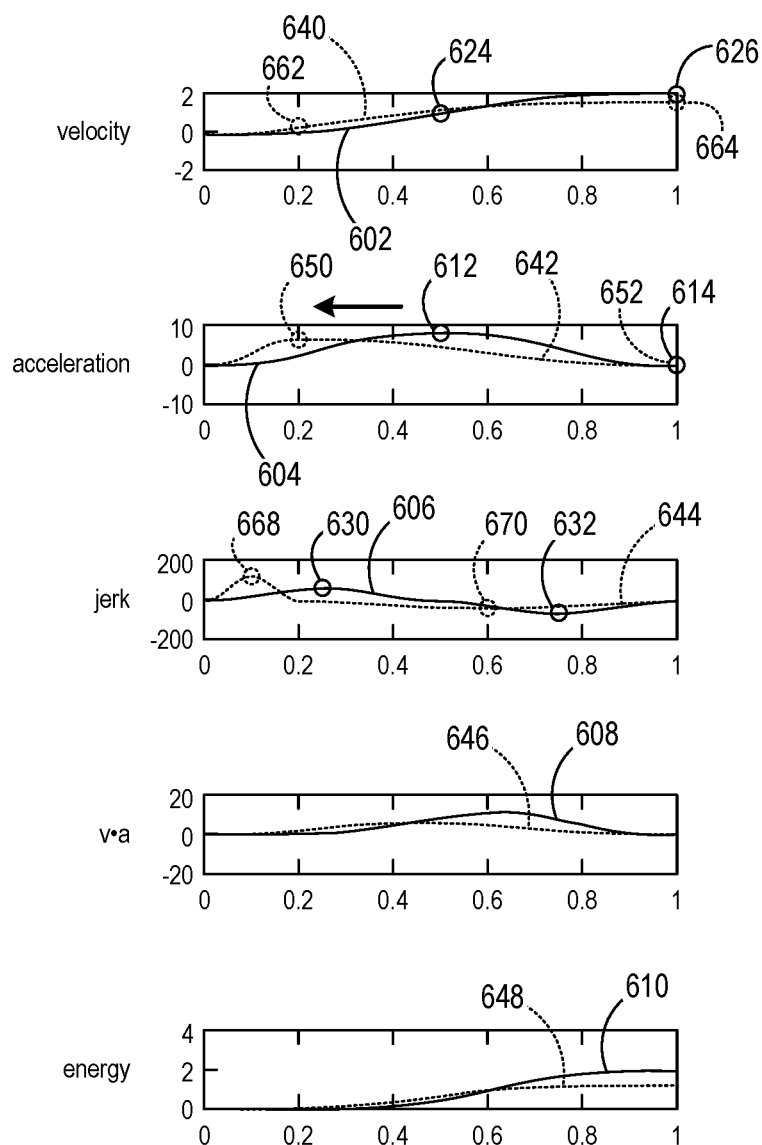
FIG. 6 illustrates a velocity-based graphical motion profile adjustment according to an embodiment.

The motor optimization process 300 of FIG. 3 also served to acquire, load, and modify a motor control curve that is a velocity-based motor control curve 602 illustrated in FIG. 6, which illustrates graphical curves generated, calculated, and/or manipulated via motor optimization process 300.

Referring to FIGS. 3 and 6, process 300 begins at step 302 and acquires and loads a motor control curve 602 to be modified/optimized according to embodiments of the invention. As illustrated in FIG. 6, the motor control curve loaded for modification is a motor velocity curve. The motor control curve may be defined by a set of points in a table, by a mathematical equation, or by other means that control movement of the motor position over time. The set of points in a table may define, for example, a cam function or equation. Loading the motor control curve at step 302 includes identifying or calculating the velocity curve defined by the set of points or mathematical equation such that the motor velocity over time is represented by the velocity curve. The motor control curve may be stored on industrial controller 110 or motor drive 108 and supplied to computer 114 in response to a request therefor. Alternatively, the motor control curve may be stored on computer 114 or on some other network storage device (e.g., network storage device 118) to which computer 114 has access.

After the motor control curve 602 is loaded, its derivative curves are calculated at step 304. As shown in FIG. 6, an acceleration curve 604, which is the first derivative of the velocity curve 602, and a jerk curve 606, which is the second derivative of the velocity curve 602, are calculated. The acceleration curve 604 may be calculated by taking the first derivative of the velocity curve 602. The jerk curve 606 may be calculated by taking the second derivative of the velocity curve 602 or taking the first derivative of the acceleration curve 604. Additional generated curves include a relative power curve 608, which is formed by the multiplication or other combination of the velocity curve 602 with the acceleration curve 604, and a relative energy curve 610, which is formed by integrating the power curve 608 and which provides an idea of the energy content required to perform the motor control curve 602.

At step 306, one or more curve modification points are determined or identified. In one embodiment, curve modification points 612-614 respectively corresponding with maximum, central, and minimum values of the acceleration curve 604 are identified. The curve modification points may be determined or identified for local maximum/minimum values, inflection points, central locations, and other locations of interest. Corresponding curve modification points 624-626 are identified for the motor control curve 602 as well. Curve modification points 630-632 for the jerk curve 606 are determined for various maximum and minimum values and do not correspond in time with the points 612-614 in this example, but time correspondence with points 612-614 may be desired in other implementations.

At step 308, duplicate curves are created of the previously loaded and calculated curves 602-610 with their respective curve modification points 612-632 in order to display, view, and compare results in curve modification. As illustrated in FIG. 6, the original, unmodified velocity curve 602 loaded at step 302 together with its derivatives and other related curves 604-610 are shown in solid lines while a modified velocity motor control curve 640 described herein below together with its derivatives and other related curves (modified acceleration curve 642, modified jerk curve 644, modified power curve 646, and modified energy curve 648) and their respective curve modification points 650-670 are shown in dotted lines. Other display differences such as different colors may be used in addition or alternatively thereto. When initially created, the modified curves 640-648 match the respective curves 602-610. However, as the modified curves 640-648 get modified by the user, the matching and similarity with the respective curves 602-610 disappear.

One or more of the created original and duplicate curves 602-610, 640-648 are displayed for the user at step 310. In a preferred embodiment, at least the curves related to acceleration and energy (curves 604, 642, 610, and 648) are displayed to allow the user to manipulate and modify the acceleration curve 642 while viewing comparison results in the energy curves 610, 648. However, it is contemplated that all of the created original and duplicate curves 602-610, 640-648 are displayed for the user to allow the user to view the results that apply in response to each modification.

At steps 312 and 314, a user modification in the velocity of one or more curve modification points is received, and updated results of the modified curves are calculated and displayed. In particular, at step 312, the user inputs a change in the velocity of one of the curve modification points. User input that modifies or changes the velocity of a curve modification point includes receiving a mouse input, a touch input, or other similar input directly on a graphical object representing the curve modification point as the user moves the point left or right in time. The horizontal, time axes illustrated in the graphs of FIG. 6 range from 0 to 1 and may indicate a time change from 0 to 1 second or a time change of a different time duration that is normalized to the range of 0 to 1. According to additional embodiments, user input changing the curve modification points may be accomplished via rotation of a virtual or mechanical knob, manipulation of a scrollbar object, text entry via a keyboard or other similar device of the desired time or relative time change, or other the like.

FIG. 6 shows an example of the user having modified or manipulated the time velocity of curve modification point 650 from its previous velocity corresponding with curve modification point 612 around time point 0.5 to its new time point around time point 0.2. Modification of the curve modification points may be set up such that when one curve modification point is modified, any corresponding curve modification point of the same curve but on the opposite side of the curve center is reciprocally modified.

During or in response to user editing of the curve modification point 650, the area under the modified acceleration curve 642 is calculated and maintained. That is, in order to maintain the area under the modified acceleration curve 642 constant, the peak value of the curve modification point 650 is adjusted. In the example illustrated in FIG. 6, the peak value of the curve modification point 650 is reduced compared with the original peak value at curve modification point 612. In this manner, the movement from velocity 0 to velocity 1 as defined by modified motor control curve 640 remains fixed to the original time. Thus, the motor that is manipulated and/or controlled by the modified motor control curve 640 results in the finished task being completed on time and in a similar or same manner.

As a result of the change, at step 314, to curve modification point 650 of modified acceleration curve 642, motor optimization process 300 calculates modified curve profiles of the other modified curves (e.g., modified velocity curve 640, modified jerk curve 644, modified power curve 646, and modified energy curve 648) at step 314. For example, the peak acceleration at curve modification point 650 corresponds with the inflection point at curve modification point 662, so curve modification point 662 is also be modified to match the change. The calculation at step 314 is preferably performed in real-time or near real-time to allow the user to view substantially instantaneous changes in the set of modified curve profiles 640-648.

While the example illustrated in FIG. 6 is described with respect to the modification of curve modification point 650, embodiments of the invention contemplate the user input to include modification of any of the curve modification points 612-632 and 650-670. Appropriate re-calculations of the modified curves other than the one being currently modified by the user are performed as described herein.

As a result of user input modification to curve modification point 650, curve modification point 668 of modified jerk curve 644 is moved to the left, and its peak value is increased (to maintain a similar area under the curve). The increased jerk indicates that the motor, when controlled via the modified motor control curve 640, will experience a rougher operation as compared with the unmodified motor control curve 602. However, while the jerk peak at 668 increased from 630, the jerk peak at 670 decreased from 672. The net result is lower peak power consumption V*A and lower total energy. Depending on the type and/or operational specifications of the motor, the re-positioning of the jerk maximum peak value earlier in time and stronger in magnitude may more closely match the characteristics of the motor, which can increase motor efficiency and life. The benefit of more closely matching the characteristics of the motor that helps with extending motor efficiency and life it is not, however, represented in the curves, which are independent of the system they are applied to as reference commands. Alternatively, the characteristics of the motor may cause it to experience an increase in stress at an inefficient point, thus possibly reducing its life. User manipulation of the curve modification point 650 (and the other curve modification points) allows the user to verify one or more positions of the points in order to optimize motor performance in achieving the movement from velocity 0 to velocity 1.

As indicated by flowchart arrow 316, motor optimization process 300 may continue to receive additional user inputs to the same or to other curve modification points that will cause the modified curve profiles to be further calculated and displayed. Calculation of the modified power curve 646 and the modified energy curve 648 allows the user to view the resulting changes in projected power and energy usage in real-time or as often as the modified curve profiles are re-calculated in step 314.

After the user input has finished, the user may cause motor optimization process 300 to generate a new, modified command signal based on the modified motor control curve 640 at step 318. The modified command signal, which is distinct from the original command signal, is then loaded into a motor drive (e.g., motor drive 108) coupled to the intended motor (e.g., motor 104) at step 320. Loading the modified command signal into the motor drive may include first converting the modified command signal into a set of tabular values. Alternatively, the modified command signal function or equation may be loaded into the motor drive. For example, the computer 114 may transmit the modified command signal function, equation, or set of tabular points to the motor drive for storage therein. The computer 114 may alternatively transmit the modified command signal function, equation, or set of tabular points to the industrial controller 110 to be stored and used during system operation.

At step 322, the motor is controlled via the motor drive according to the modified command signal as defined in the control of the industrial automation system.

Figure 7:
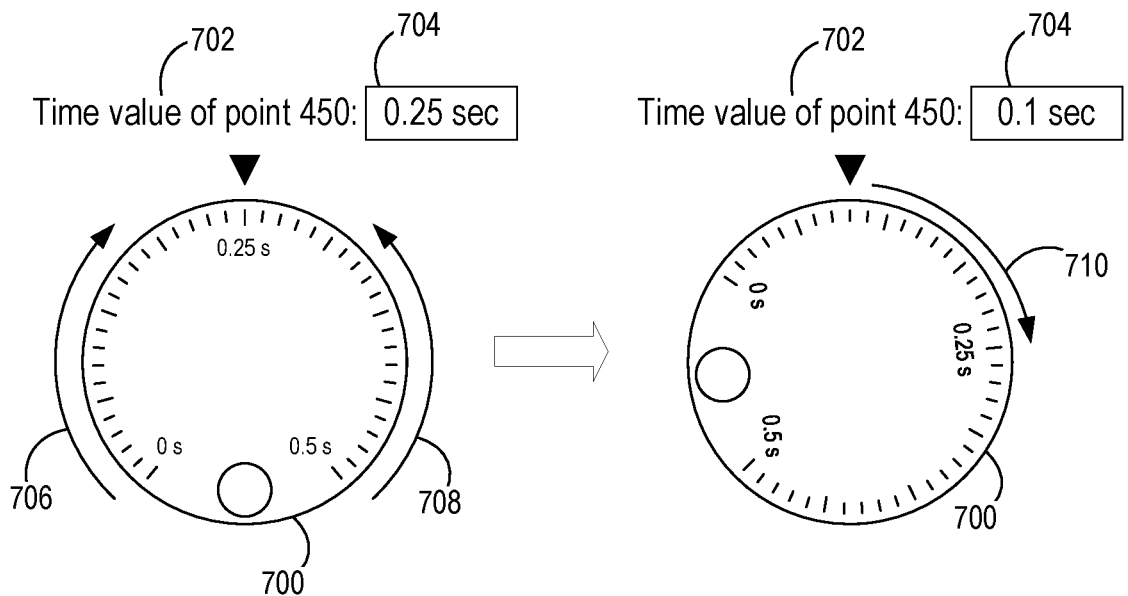
FIG. 7 illustrates a graphical user interface control for adjusting a curve modification point according to an embodiment.

FIG. 7 illustrates modification of curve modification point 450 via a graphical user interface. A graphical knob 700 is illustrated showing a rotation range between 0 seconds and 0.5 seconds, which corresponds with the movement range of curve modification point 450 along the timeline of the acceleration plot shown in FIG. 4. An indication 702 of which time point is selected or available for modification is shown as well as an indication 704 of the time position of the curve modification point. Rotation of the graphical knob 700 in the clockwise direction 706 or in the counterclockwise direction 708 correspondingly modifies the time position number 704 of the curve modification point.

As shown in FIG. 7, the control knob 700 may initially be shown (in the left-hand view) in the 0.25 second position corresponding to the starting position of curve modification point 450 as initially calculated. Then, a clockwise rotation 710 of the control knob 700 to a position corresponding with 0.1 seconds is shown in the right-hand view. As illustrated in FIG. 4, the modification of the time value of curve modification point 450 causes its position to move left to the corresponding time position along the acceleration timeline. Also as detailed above, the leftward movement of curve modification point 450 also results in a downward movement of curve modification point 450 along the value axis of the acceleration plot to maintain the area under the modified acceleration curve 442 constant.

The rotational movement of the graphical knob 700, when corresponding with movement of the curve modification point 450 along the time axis of the acceleration plot, is preferably controled in a linear manner such that a constant rotation of the graphical knob 700 results in a constant corresponding movement of the curve modification point 450.

Figure 8:
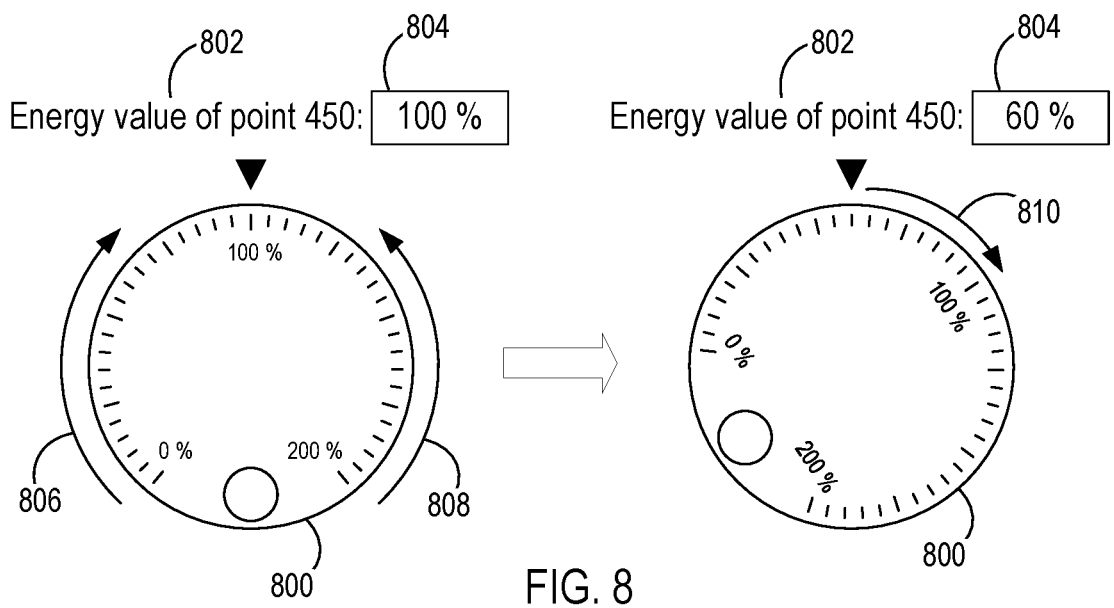
FIG. 8 illustrates a graphical user interface control for adjusting a curve modification point according to another embodiment.

FIG. 8 illustrates modification of curve modification point 450 via a graphical user interface. A graphical knob 800 is illustrated showing a rotation range between 0 percent and 200 percent, which corresponds with the movement range of curve modification point 450 between 0 seconds and 0.5 seconds along the timeline of the acceleration plot shown in FIG. 4. The indicated percentage corresponds with an energy percentage that results from movement of the curve modification point 450 along the acceleration timeline. An indication 802 of which time point is selected or available for modification is shown as well as an indication 804 of the energy percentage of the curve modification point. Rotation of the graphical knob 800 in the clockwise direction 806 or in the counterclockwise direction 808 correspondingly modifies the of the curve modification point. The result of the energy percentage compared with the starting position energy position of the curve modification point 450 is indicated in the energy percentage number 804 and on the graphical knob 800.

As shown in FIG. 8, the control knob 800 may initially be shown (in the left-hand view) in the 100% position corresponding to the starting energy percentage of the curve modification point 450 as initially calculated. Then, a clockwise rotation 810 of the control knob 800 to a position corresponding with 60% is shown in the right-hand view. As illustrated in FIG. 4, the modification of the energy percentage of curve modification point 450 causes its position to move left to the corresponding time position along the acceleration timeline for which the energy percentage matches the value of control knob 800. Also as detailed above, the leftward movement of curve modification point 450 also results in a downward movement of curve modification point 450 along the value axis of the acceleration plot to maintain the area under the modified acceleration curve 442 constant.

The rotational movement of the graphical knob 800, when corresponding with movement of the curve modification point 450 according to energy percentage, may or may control movement of the curve modification point 450 in a linear manner Depending on the energy percentage, movement of the curve modification point 450 may increase or decrease compared with a constant rotation of the graphical knob 800 such that the value of the energy percentage indicated by graphical knob 800 and energy percentage indication 804 match the corresponding position of the curve modification point 450.

Figure 9:
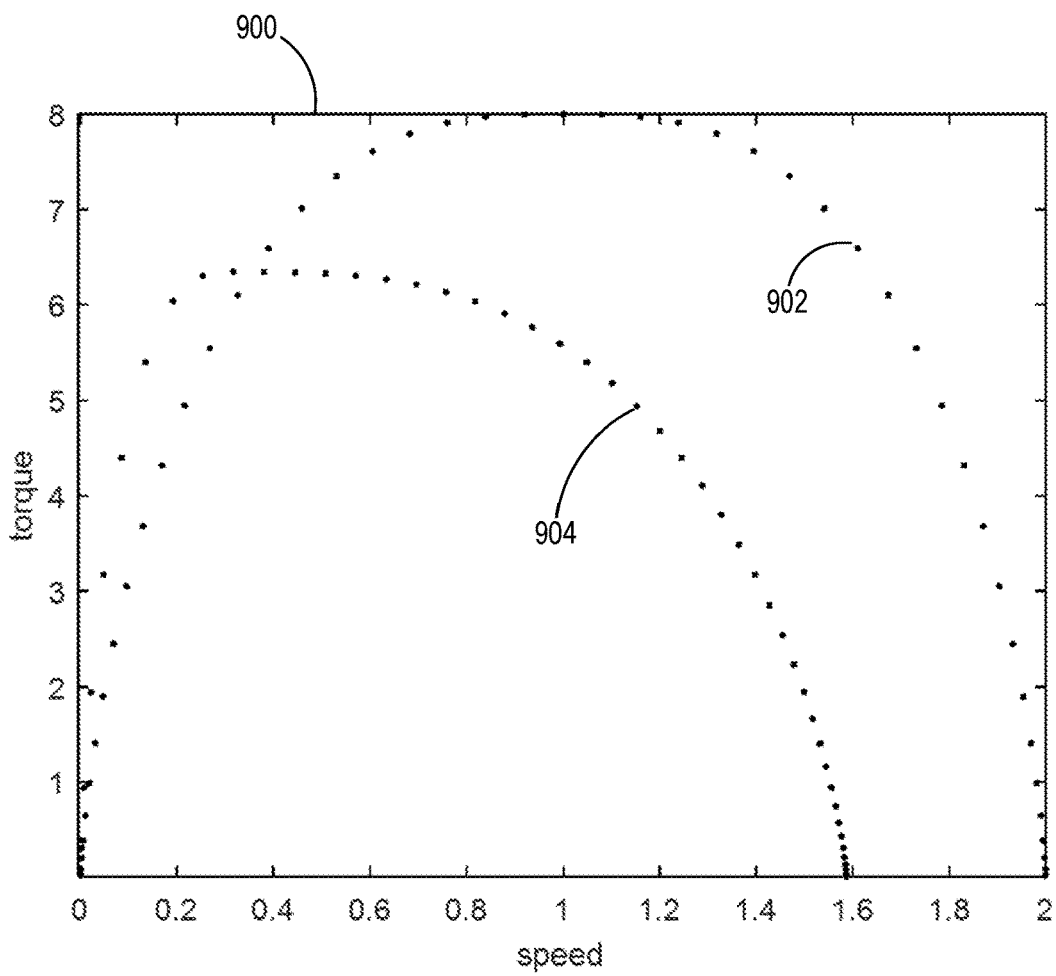
FIG. 9 illustrates a motor speed/torque plot according to an embodiment.

FIG. 9 illustrates a motor speed/torque plot 900 according to an embodiment. Plot 900 shows an initial speed/torque curve 902 calculated for the use of a standard, known motion curve such as one selected from FIG. 2 to perform a desired industrial task. A modified speed/torque curve 904 is also shown after applying an optimization process to the standard motion curve as described herein. As illustrated, less torque is required after optimization (modified speed/torque curve 904) than before the optimization (initial speed/torque curve 902). The reduction in torque typically allows for a smaller-sized motor to be used to complete the same task. Accordingly, savings in terms of motor costs for a smaller motor as well as energy costs to perform the task are capable of being realized.

Figure 10:
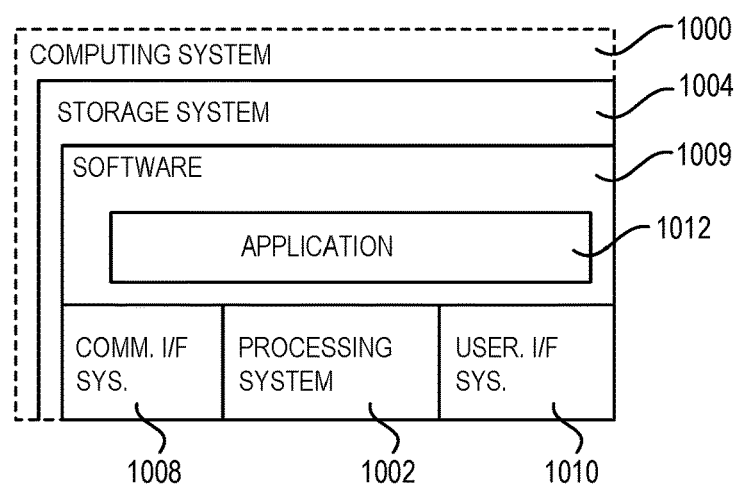
FIG. 10 illustrates a computing system in an exemplary implementation.

FIG. 10 illustrates a computing system 1000, which is representative of any system or collection of systems in which the various applications, services, scenarios, and processes disclosed herein may be implemented. Examples of computing system 1000 include, but are not limited to, desktop computers, laptop computers, tablet computers, computers having hybrid form-factors, mobile phones, smart televisions, wearable devices, server computers, blade servers, rack servers, and any other type of computing system (or collection thereof) suitable for carrying out the application launching operations described herein. Such systems may employ one or more virtual machines, containers, or any other type of virtual computing resource in the context of supporting enhanced group collaboration. In one embodiment, computing system 1000 is an example of computer 114 illustrated in FIG. 1.

Computing system 1000 may be implemented as a single apparatus, system, or device or may be implemented in a distributed manner as multiple apparatuses, systems, or devices. Computing system 1000 includes, but is not limited to, processing system 1002, storage system 1004, software 1006, communication interface system 1008, and user interface system 1010. Processing system 1002 is operatively coupled with storage system 1004, communication interface system 1008, and user interface system 1010.

Processing system 1002 loads and executes software 1006 from storage system 1004. Software 1006 includes application 1012, which is representative of a software application executed by a processor and programmed to execute the methods described herein. When executed by processing system 1002 to facilitate and guide pre-booking requests, application 1012 directs processing system 1002 to operate as described herein for at least the various processes, operational scenarios, and sequences discussed in the foregoing implementations. Computing system 1000 may optionally include additional devices, features, or functionality not discussed for purposes of brevity.

Referring still to FIG. 10, processing system 1002 may comprise a micro-processor and other circuitry that retrieves and executes software 1006 from storage system 1004. Processing system 1002 may be implemented within a single processing device, but it may also be distributed across multiple processing devices or sub-systems that cooperate in executing program instructions. Examples of processing system 1002 include general purpose central processing units, application specific processors, and logic devices, as well as any other type of processing device, combinations, or variations thereof.

Storage system 1004 may comprise any computer readable storage media readable by processing system 1002 and capable of storing software 1006. Storage system 1004 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations, storage system 1004 may also include computer readable communication media over which at least some of software 1006 may be communicated internally or externally. Storage system 1004 may be implemented as a single storage device, but it may also be implemented across multiple storage devices or sub-systems co-located or distributed relative to each other. Storage system 1004 may comprise additional elements, such as a controller, capable of communicating with processing system 1002 or possibly other systems.

Software 1006 in general, and application 1012 in particular, may be implemented in program instructions and among other functions may, when executed by processing system 1002, direct processing system 1002 to operate as described with respect to the various operational scenarios, sequences, and processes illustrated herein. For example, application 1012 may include program instructions for facilitating command signal optimization procedures such at that described in method 300.

In particular, the program instructions may include various components or modules that cooperate or otherwise interact to carry out the various processes and operational scenarios described herein. The various components or modules may be embodied in compiled or interpreted instructions, or in some other variation or combination of instructions. Software 1006 may include additional processes, programs, or components, such as operating system software, virtual machine software, or other application software, in addition to or that include application 1012. Software 1006 may also comprise firmware or some other form of machine-readable processing instructions executable by processing system 1002.

In general, application 1012 may, when loaded into processing system 1002 and executed, transform a suitable apparatus, system, or device (of which computing system 1000 is representative) overall from a general-purpose computing system into a special-purpose computing system customized to enhance entity classification operations. Indeed, encoding application 1012 on storage system 1004 may transform the physical structure of storage system 1004. The specific transformation of the physical structure may depend on various factors in different implementations of this description. Examples of such factors may include, but are not limited to, the technology used to implement the storage media of storage system 1004 and whether the computer-storage media are characterized as primary or secondary storage, as well as other factors.

For example, if the computer readable storage media are implemented as semiconductor-based memory, application 1012 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1008 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1010 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1010. In some cases, the input and output devices may be combined in a single device, such as a display capable of displaying images and receiving touch gestures. The aforementioned user input and output devices are well known in the art and need not be discussed at length here.

User interface system 1010 may also include associated user interface software executable by processing system 1002 in support of the various user input and output devices discussed above. Separately or in conjunction with each other and other hardware and software elements, the user interface software and user interface devices may support a graphical user interface, a natural user interface, or any other type of user interface, in which a user interface to an application may be presented.

Communication between computing system 1000 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well-known and need not be discussed at length here. In any of the aforementioned examples in which data, content, or any other type of information is exchanged, the exchange of information may occur in accordance with any of a variety of well-known data transfer protocols.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A system for controlling an electromechanical device in an industrial automation environment comprising:
   a memory that stores executable components; and
   a processor, operatively coupled to the memory, that executes the executable components, the executable components comprising:
   a display component configured to:
      display, simultaneously, an acceleration curve and a duplicate acceleration curve, wherein the acceleration curve is based on a command signal configured to cause an electromechanical device to mechanically operate a mechanical load;
      display, simultaneously, an energy curve and a duplicate energy curve, wherein the energy curve is based on the acceleration curve; and
      receive an input to change at least a portion of the duplicate acceleration curve;
   a signal generating component configured to:
      calculate a change to the duplicate acceleration curve based on the input;
      calculate a change to the duplicate energy curve based on the change to the duplicate acceleration curve;
      generate a modified command signal based on the change to the at least a portion of the duplicate acceleration curve; and
   a drive component configured to:
      control the electromechanical device via the command signal; and
      control the electromechanical device via the modified command signal.

2. The system of claim 1, wherein the modified command signal is distinct from the command signal.

3. The system of claim 1, wherein
the signal generating component is further configured to:
   generate a position curve based on the command signal;
   generate a duplicate position curve based on the command signal;
   generate a velocity curve based on the command signal;
   generate a duplicate velocity curve based on the command signal;
   generate a jerk curve based on the command signal; and
   generate a duplicate jerk curve based on the command signal; and
the display component is further configured to:
   display the position curve, the duplicate position curve, the velocity curve, the duplicate velocity curve, the jerk curve, and the duplicate jerk curve.

4. The system of claim 3, wherein:
the velocity curve corresponds with a first derivative of the position curve;
the acceleration curve corresponds with a second derivative of the position curve; and
the jerk curve corresponds with a third derivative of the position curve.

5. The system of claim 3, wherein the signal generating component, in being configured to generate the modified command signal, is further configured to:
   calculate a change to the duplicate position curve based on the change to the duplicate acceleration curve; and
   generate the modified command signal based on the change to the duplicate position curve.

6. The system of claim 3, wherein the signal generating component is further configured to:
   generate a power curve comprising a plurality of values of the velocity curve multiplied by corresponding values of the acceleration curve; and
   generate an energy curve based on integrating the power curve.

7. The system of claim 1, wherein the signal generating component is further configured to:
   identify a curve modification point corresponding with the duplicate acceleration curve; and
   change the at least a portion of the duplicate acceleration curve in response to receiving a modification to a position of the curve modification point.

8. The system of claim 1, wherein the signal generating component is further configured to:
   transmit the modified command signal for storage.

9. The system of claim 1, wherein the signal generating component is further configured to:
   convert the modified command signal into a set of tabular values.

10. A process for optimizing motor control in an industrial automation environment comprising:
   acquiring, by a system comprising a processor, a motor control curve configured to cause a motor to operate a mechanical load;
   displaying, simultaneously and by the system:
      a motor acceleration curve that is based on the motor control curve,
      a duplicate motor acceleration curve of the motor acceleration curve,
      a motor energy curve that is based on the motor acceleration curve, and
      a duplicate motor energy curve that is based on the duplicate motor energy curve;
   calculating, by the system, a change to the duplicate motor acceleration curve based on an input modifying a portion of the duplicate motor acceleration curve;
   calculating, by the system, a change to the duplicate motor energy curve based on the change to the duplicate motor acceleration curve;

generating, by the system, a modified command signal based on the change to the duplicate motor acceleration curve; and controlling, by the system, the motor via the modified command signal to operate the mechanical load.

11. The process of claim 10, further comprising generating, by the system, a duplicate motor control curve based on the motor control curve.

12. The process of claim 11, wherein generating the modified command signal comprises:

calculating, by the system, a change to the duplicate motor control curve based on the change to the duplicate motor acceleration curve; and generating, by the system, the modified command signal based on the change to the duplicate motor control curve.

13. The process of claim 11, further comprising:

generating, by the system, a motor velocity curve based on the motor control curve;

generating, by the system, a duplicate motor velocity curve based on the motor control curve;

generating, by the system, a motor jerk curve based on the motor control curve;

generating, by the system, a duplicate motor jerk curve based on the motor control curve; and displaying, by the system, the motor control curve, the duplicate motor control curve, the motor velocity curve, the duplicate motor velocity curve, the motor jerk curve, and the duplicate motor jerk curve on the display.

14. The process of claim 13, wherein:

generating the motor velocity curve comprises generating, by the system, a first derivative of the motor control curve;

generating the motor acceleration curve comprises generating, by the system, a second derivative of the motor control curve; and generating the motor jerk curve comprises generating, by the system, a third derivative of the motor control curve.

15. The process of claim 13, wherein the process further comprises:

calculating, by the system, a change to the duplicate motor control curve based on a user input modifying a portion of the duplicate motor control curve; and calculating, by the system, a change to the duplicate motor energy curve based on the change to the duplicate motor control curve.

16. The process of claim 13, wherein the process further comprises:

calculating, by the system, a change to the duplicate motor velocity curve based on a user input modifying a portion of the duplicate motor velocity curve; and calculating, by the system, a change to the duplicate motor energy curve based on the change to the duplicate motor velocity curve.

17. The process of claim 13, wherein the process further comprises:

calculating, by the system, a change to the duplicate motor jerk curve based on a user input modifying a portion of the duplicate motor jerk curve; and calculating, by the system, a change to the duplicate motor energy curve based on the change to the duplicate motor jerk curve.

18. The process of claim 13, wherein generating the motor energy curve comprises:

generating, by the system, a motor power curve comprising a plurality of values of the motor velocity curve multiplied by corresponding values of the motor acceleration curve; and generating, by the system, the motor energy curve based on integrating the motor power curve.

19. A non-transitory computer-readable storage-media medium having stored thereon instructions that, in response to execution, cause a system comprising a processor to perform operations, the operations comprising displaying, simultaneously, an acceleration curve and a duplicate acceleration curve, wherein the acceleration curve is based on a command signal configured to cause an electromechanical device to mechanically operate a mechanical load;

displaying, simultaneously, an energy curve and a duplicate energy curve, wherein the energy curve is based on the acceleration curve; and receiving an input indicating a change to at least a portion of the duplicate acceleration curve;

calculating a change to the duplicate acceleration curve based on the input;

calculating a change to the duplicate energy curve based on the change to the duplicate acceleration curve;

displaying the change to the duplicate energy curve on the display;

generating a modified command signal based on the change to the at least a portion of the duplicate acceleration curve; and controlling the electromechanical device via the modified command signal to mechanically operate the mechanical load.

20. The non-transitory computer-readable medium of claim 19, wherein calculating the change to the duplicate acceleration curve comprises calculating the change to the duplicate acceleration curve in real-time as the input is received.

* * * * *